Sept. 28, 1954  A. J. SHERRY  2,690,159
REMOVABLE LANDING PERCH FOR BIRD CAGES
Filed Jan. 16, 1953
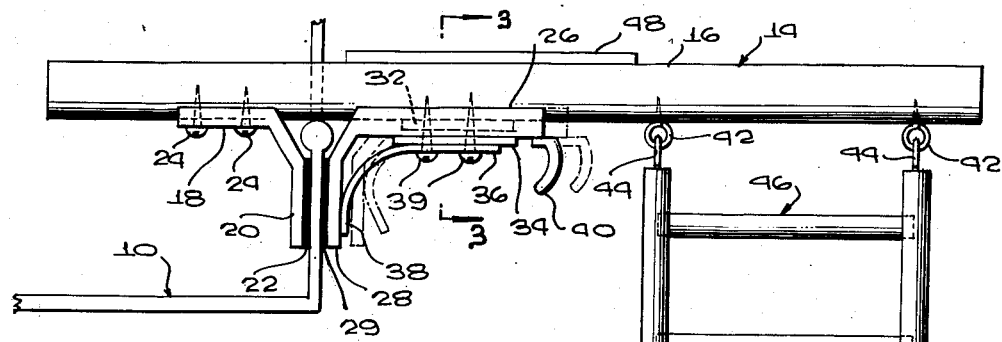
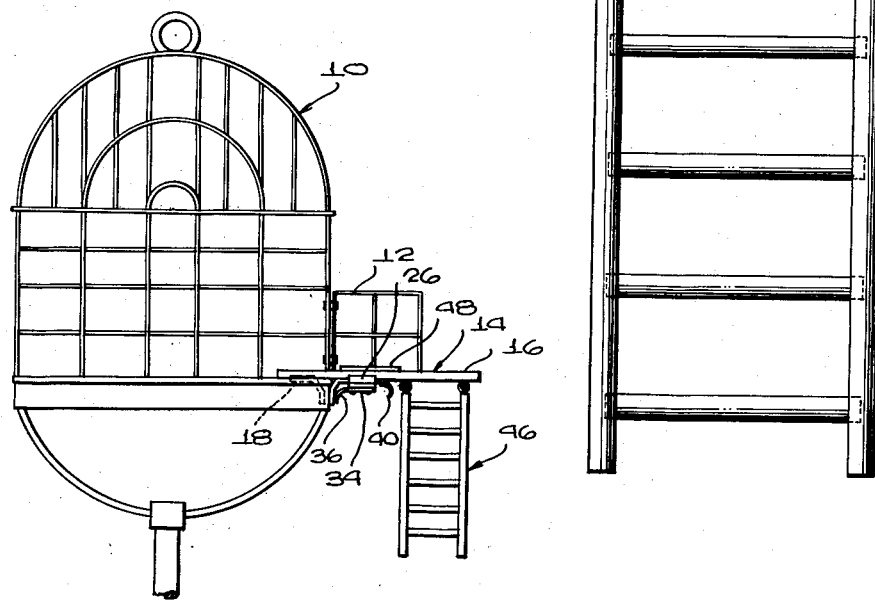
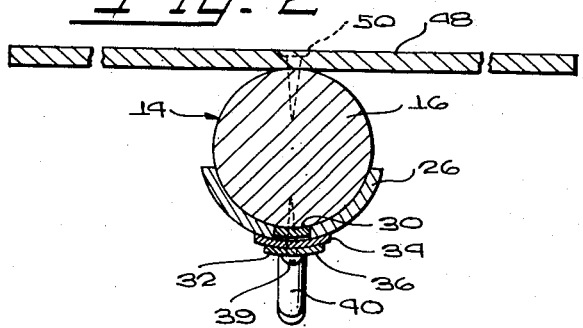
INVENTOR.
Arthur J. Sherry
BY
McMorrow, Berman & Davidson
ATTORNEYS Patented Sept. 28, 1954

2,690,159

UNITED STATES PATENT OFFICE 2,690,159

REMOVABLE LANDING PERCH FOR BIRD CAGES

Arthur J. Sherry, Newark, N. J.

Application January 16, 1953, Serial No. 331,557

3 Claims. (Cl. 119—26)

This invention relates to a landing perch. More particularly, the invention has reference to a perch for caged birds, such as canaries, or parrakeets.

In recent years, parrakeets or budgerigars have become increasingly popular as domestic pets, and among owners of these birds, it is a common practice to leave the bird out of the cage for substantial periods of time, to allow the bird the freedom of the home.

Parrakeets can be easily trained, and are capable of being trained, without appreciable difficulty, to return voluntarily to their cages. In such instances, of course, the cage door must be kept open.

It has been found, in this regard, that a parrakeet will experience considerable difficulty in landing in the relatively small area defined by the doorway of the bird cage, and this has the natural result of discouraging the efforts of the bird to return to the cage.

In view of the above, the main object of the present invention is to provide a landing perch that can be attached to a bird cage at the doorway of the cage, to permit the bird to make a landing at the doorway and return to his cage.

Another object is to provide a landing perch as described which can be easily attached to or detached from the bird cage wall, this being desirable, of course, to permit the perch's removal whenever the doorway of the cage is to be closed.

Another object is to provide a landing perch as described which, when mounted in place within the doorway of a bird cage, will hold a swinging door in an open position.

Still another object is to provide a landing perch as described which will have end portions extending interiorly and exteriorly of the cage, respectively, thus to facilitate the bird's entering or leaving the cage.

A further object of importance is to provide a landing perch of the character referred to which will be so designed as to permit is mounting upon any of various conventional bird cages differing from one another in design, without the necessity of modifying or redesigning said cages.

Still another object is to provide a landing perch of the type stated which will be attractive to the birds, and which will, additionally, be capable of manufacture at relatively low cost.

Other objects will appear from the following description, the claims appended thereto, and from the annexed drawing, in which like reference characters designate like parts throughout the several views, and wherein:

Figure 1 is a side elevational view of a landing perch formed in accordance with the present invention, the dotted lines showing a second position of a clamp member, used when the perch is being attached to or detached from the cage wall, the wall of the cage being illustrated fragmentarily;

Figure 2 is a small scale elevational view of a bird cage, showing the perch in operative relationship to said cage; and Figure 3 is a transverse sectional view, the scale being enlarged, taken substantially on line 3—3 of Figure 1.

Referring to the drawings in detail, the reference numeral 10 has been applied generally to a cage such as is used to house a parrakeet or canary. The cage 10 is provided with a swingable door 12 which, in one form of bird cage in wide spread use, is spring urged to a normally closed position.

The device constituting the present invention has been designated generally at 14, and includes an elongated rod 16 which in the present instance, but not necessarily, is of circular cross sectional configuration. The rod 16 is adapted to be disposed within the doorway of the bird cage, the rod having an inner end portion shown at the left in Figure 1, that projects into the cage, and an outer end portion that projects laterally and outwardly from the bird cage a substantial distance, said outer end portion being shown at the right in Figure 1.

Fixedly connected to the inner end portion of the rod 16 is a first clamp member 18, said clamp member 18 being formed from a single piece of molded plastic or the like, and being integrally provided with a depending leg 20 to which is cemented or otherwise attached a cushioning pad 22, said pad 22 serving to prevent marring of the wall of the cage against which the leg 20 of the first clamp member is positioned.

The clamp member 18, at its upper end, is formed with a horizontal portion which may be of arcuate cross sectional configuration so as to be disposed in contact throughout its area with the underside of the rod 16, the horizontal portion of the clamp member 18 being fixedly secured to the rod 16 by longitudinally spaced screws 24 or equivalent fastening elements.

A second clamp member 26 is disposed exteriorly of the cage 10, when the landing perch is in use, and can also be formed of molded plastic or the like. The second clamp member 26 is integrally formed, at its inner end, with a depending leg 28 cooperating with the leg 20 to hold the landing rod 16 in position within the doorway of the cage. A pad 29 of cushioning material can be secured to the leg 28, to prevent marring of the cage while at the same time assuring a firm grip of the clamp members upon the cage wall.

As will be noted from Figure 3, the outer end portion of the movable clamp member 26 is extended horizontally along the underside of the rod 16, and is of arcuate cross section for the purpose of snugly embracing said rod.

Formed in the outer end portion of the second clamp member is a longitudinal slot closed at its opposite ends, said slot receiving a guide block 32 substantially shorter in length than the slot. The guide block 32 thus guides the clamp member 26 during the sliding movement of the clamp member upon the rod 16, between the full and dotted line positions shown in Figure 1.

Underlying the slot 30 is a friction plate 34 of arcuate cross sectional shape (see Figure 3), and disposed below and in contact with the friction plate 34 is the outer end portion of a spring 36 having a depending inner end 38 that is tensioned to exert a continuous, yielding pressure against the leg 28, for the purpose of normally biasing the leg 28 in the direction of the cage wall. Screws 39 or equivalent fastening elements are extended through the spring, friction plate, and guide block for the purpose of anchoring these parts to the rod 16.

On the outer end of the clamp member 26 a depending lip 40 is mounted, said lip 40 affording a convenient grip for a user.

The projecting outer end portion of the rod 16 is preferably provided with a depending ladder or other device attractive to parrakeets, and accordingly, spaced eyes 42 are secured to the rod 16, said eyes loosely receiving eyes 44 secured to the upper end of a swingable, depending ladder 46. Parrakeets are readily trained to perform tricks on ladders of the type shown, and often delight in the performance of acrobatic feats.

Fixedly attached to the rod 16, intermediate the opposite ends of the rod, and disposed transversely of the rod, is a flat platform 48. The platform 48 projects laterally of the rod 16 in opposite directions, as shown in Figure 3, and one end edge of the platform is adapted to engage the swingable door 12, to hold said door in an open position. The platform 48, of course, has its main function in affording a ledge that can be used by the bird.

In use of the perch, the finger grip 40 is grasped, and is urged to the dotted line position shown in Figure 1. This pulls the leg 28 in a direction away from the leg 20, thereby to permit the rod 16 to be either attached to or detached from the cage wall, with ease and facility. When the grip 40 is released, the spring 38 will urge the leg 28 toward the leg 20, thus to hold the rod 16 in proper position upon the cage wall.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A landing perch comprising a rod adapted to be extended into a bird cage through a doorway in a side wall thereof; a first clamp member fixedly mounted on the rod and having a depending leg engageable against the cage wall inside of the doorway; a guide block secured to the rod; a second clamp member having a longitudinal slot receiving the guide block to slidably mount the second clamp member on the rod, the second clamp member having a depending leg movable into and out of engagement with said wall outside of the doorway on sliding of the second clamp member upon the rod; a friction plate secured to the rod and underlying the second clamp member to hold the same in slidable contact with the rod; and a spring secured to the friction plate and having a depending end portion engageable against the second-named leg and tensioned to exert pressure thereagainst tending to bias the second-named leg into engagement with the cage wall.

2. The apparatus of claim 1 wherein a horizontal cross member carried by the rod projects laterally of the rod to engage a door attached to the doorway for holding the door in open position.

3. The apparatus of claim 1 wherein a ladder is swingingly connected to the portion of the rod projecting outwardly from the bird cage doorway.

References Cited in the file of this patent

UNITED STATES PATENTS

| Number | Name | Date |
|---|---|---|
| 266,555 | Thorpe | Oct. 24, 1882 |
| 567,543 | Kinemann et al. | Sept. 8, 1896 |
| 642,094 | Downing | Jan. 30, 1900 |
| 1,052,234 | Gaertner | Feb. 4, 1913 |
| 2,131,609 | Alexander | Sept. 27, 1938 |
| 2,206,775 | Hoofer | July 2, 1940 |
| 2,624,310 | Smithson | Jan. 6, 1953 |

FOREIGN PATENTS

| Number | Country | Date |
|---|---|---|
| 466,084 | Germany | Sept. 29, 1928 |